United States Patent
Piskunov et al.

(10) Patent No.: US 10,386,642 B2
(45) Date of Patent: Aug. 20, 2019

(54) HOLOGRAPHIC SEE-THROUGH OPTICAL DEVICE, STEREOSCOPIC IMAGING SYSTEM, AND MULTIMEDIA HEAD MOUNTED SYSTEM

(71) Applicant: SAMSUNG ELECTRONICS CO., LTD., Suwon-si (KR)

(72) Inventors: Dmitry Evgenievich Piskunov, Moscow region (RU); Aleksander Viktorovich Morozov, Moscow region (RU); Mikhail Vyacheslavovich Popov, Krasnogorsk (RU); Natalia Vladimirovna Zakharova, Moscow region (RU); Nikolay Viktorovich Muravev, Moscow region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/310,013

(22) PCT Filed: Jul. 6, 2015

(86) PCT No.: PCT/KR2015/006910
§ 371 (c)(1),
(2) Date: Nov. 9, 2016

(87) PCT Pub. No.: WO2016/010289
PCT Pub. Date: Jan. 21, 2016

(65) Prior Publication Data
US 2017/0235144 A1    Aug. 17, 2017

(30) Foreign Application Priority Data

Jul. 15, 2014   (RU) ............................... 2014129193
May 22, 2015   (KR) ....................... 10-2015-0071934

(51) Int. Cl.
*G02B 27/00*   (2006.01)
*G02B 27/01*   (2006.01)
(Continued)

(52) U.S. Cl.
CPC ............ *G02B 27/0172* (2013.01); *G02B 5/18* (2013.01); *G02B 5/32* (2013.01); *G02B 6/00* (2013.01);
(Continued)

(58) Field of Classification Search
CPC ........ G02B 27/0172; G02B 6/34; G02B 5/32; G02B 2027/0178; G02B 2027/0174;
(Continued)

(56) References Cited

U.S. PATENT DOCUMENTS 5,696,521 A   12/1997  Robinson et al.
5,838,490 A   11/1998  Fritz
(Continued)

FOREIGN PATENT DOCUMENTS

EP   1 385 023 A1   1/2004
JP   6-338443 A    12/1994
JP   2004-29544 A   1/2004

OTHER PUBLICATIONS

International Search Report and Written Opinion dated Oct. 14, 2015 issued by the International Searching Authority in counterpart International Application No. PCT/KR2015/006910 (PCT/ISA/220/210/237).
(Continued)

*Primary Examiner* — William R Alexander
*Assistant Examiner* — Henry A Duong
(74) *Attorney, Agent, or Firm* — Sughrue Mion, PLLC

(57) ABSTRACT

A holographic see-through optical device, a stereoscopic imaging system including the same, and a multimedia head mounted system are provided. The holographic see-through
(Continued)

optical device includes a micro display; a relay optical system, which relays an image generated by the micro display; at least one waveguide comprising at least two portions having different thicknesses or different refractive indexes; at least one first holographic optical element, which is arranged at one of the two portions; and at least one second holographic optical element, which is arranged at the other one of the two portions.

18 Claims, 8 Drawing Sheets

(51) Int. Cl.
- *G02B 6/34* (2006.01)
- *G02B 5/18* (2006.01)
- *G02B 5/32* (2006.01)
- *G02B 6/00* (2006.01)
- *G03H 1/22* (2006.01)

(52) U.S. Cl.
CPC ........... *G02B 6/34* (2013.01); *G02B 27/0081* (2013.01); *G02B 2027/014* (2013.01); *G02B 2027/0118* (2013.01); *G02B 2027/0134* (2013.01); *G02B 2027/0174* (2013.01); *G02B 2027/0178* (2013.01); *G03H 2001/2226* (2013.01)

(58) Field of Classification Search
CPC ...... G02B 2027/014; G02B 2027/0134; G02B 27/0103; G02B 2027/0118; G02B 2027/0109; G02B 27/0081; G02B 6/00; G02B 5/18; G02B 2027/0181; G02B 2027/0183; G03H 2001/2226
USPC .......................................................... 359/13
See application file for complete search history.

(56) References Cited

U.S. PATENT DOCUMENTS

| | | | |
|---|---|---|---|
| 6,147,807 A | 11/2000 | Droessler et al. | |
| 6,169,613 B1 | 1/2001 | Amitai et al. | |
| 6,307,995 B1 * | 10/2001 | Veligdan | G02B 6/0033 385/129 |
| 6,580,529 B1 | 6/2003 | Amitai et al. | |
| 6,805,490 B2 | 10/2004 | Levola | |
| 6,825,987 B2 | 11/2004 | Repetto et al. | |
| 7,453,612 B2 | 11/2008 | Mukawa | |
| 7,502,168 B2 | 3/2009 | Akutsu et al. | |
| 7,724,441 B2 | 5/2010 | Amitai | |
| 8,213,065 B2 | 7/2012 | Mukawa | |
| 8,213,755 B2 | 7/2012 | Mukawa et al. | |
| 8,310,764 B2 | 11/2012 | Tanijiri | |
| 8,325,166 B2 | 12/2012 | Akutsu et al. | |
| 8,376,548 B2 | 2/2013 | Schultz | |
| 8,396,339 B2 | 3/2013 | Mukawa et al. | |
| 8,643,948 B2 * | 2/2014 | Amitai | H04N 13/344 359/489.07 |
| 2002/0135830 A1 | 9/2002 | Endo et al. | |
| 2003/0086135 A1 | 5/2003 | Takeyama | |
| 2003/0174978 A1 | 9/2003 | Veligdan | |
| 2007/0188837 A1 | 8/2007 | Shimizu et al. | |
| 2010/0157400 A1 | 6/2010 | Dimov et al. | |
| 2010/0321784 A1 | 12/2010 | De Oliveira et al. | |
| 2011/0019250 A1 | 1/2011 | Aiki et al. | |
| 2011/0164294 A1 | 7/2011 | Shimizu | |
| 2011/0194163 A1 | 8/2011 | Shimizu et al. | |
| 2011/0211239 A1 | 9/2011 | Mukawa et al. | |
| 2011/0242670 A1 | 10/2011 | Simmonds | |
| 2012/0081789 A1 | 4/2012 | Mukawa et al. | |
| 2012/0162549 A1 * | 6/2012 | Gao | G02B 27/0172 349/11 |
| 2012/0243063 A1 | 9/2012 | Mukawa | |
| 2013/0016292 A1 | 1/2013 | Miao et al. | |
| 2013/0016413 A1 | 1/2013 | Saeedi et al. | |
| 2013/0077141 A1 | 3/2013 | Akutsu et al. | |
| 2013/0141527 A1 | 6/2013 | Shimizu et al. | |
| 2013/0155513 A1 | 6/2013 | Mukawa et al. | |
| 2013/0222384 A1 | 8/2013 | Futterer | |
| 2013/0250380 A1 * | 9/2013 | Fujikawa | G02B 27/0172 359/13 |
| 2013/0322810 A1 * | 12/2013 | Robbins | G02B 5/30 385/11 |
| 2014/0168260 A1 | 6/2014 | O'Brien et al. | |
| 2014/0362180 A1 * | 12/2014 | Bickerstaff | G02B 27/0172 348/43 |

OTHER PUBLICATIONS

Communication dated Apr. 29, 2015 issued by the Russian Patent Office in counterpart Russian Patent Application No. 2014129193/28.

Communication dated Oct. 9, 2015 issued by the Russian Patent Office in counterpart Russian Patent Application No. 2014129193/28.

Communication dated Jul. 14, 2016 issued by the Russian Patent Office in counterpart Russian Patent Application No. 2014129193/28.

Communication dated Mar. 21, 2018 by the European Patent Office in counterpart European Patent Application No. 15822594.6.

Communication dated Jun. 19, 2018, issued by the State Intellectual Property Office of the People's Republic of China in counterpart Chinese Patent Application No. 201580034868.6.

* cited by examiner

[Fig. 1]
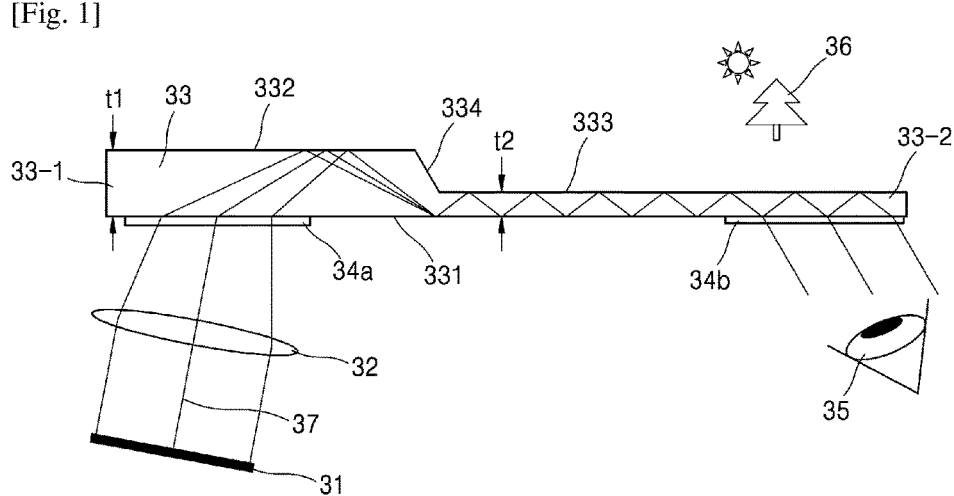
[Fig. 2]
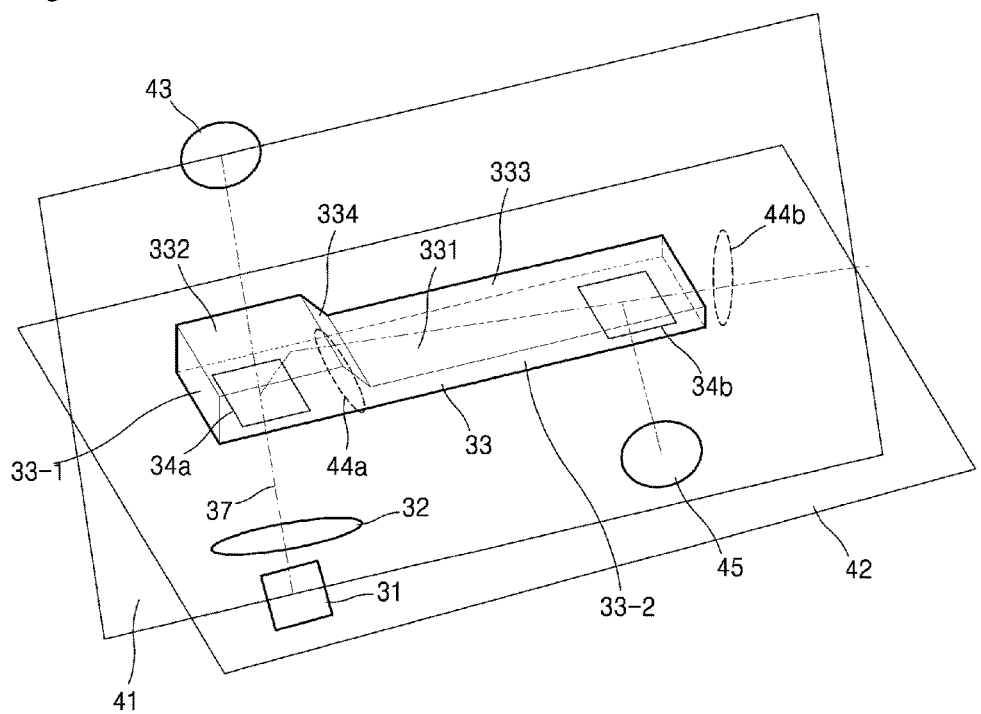

[Fig. 3]
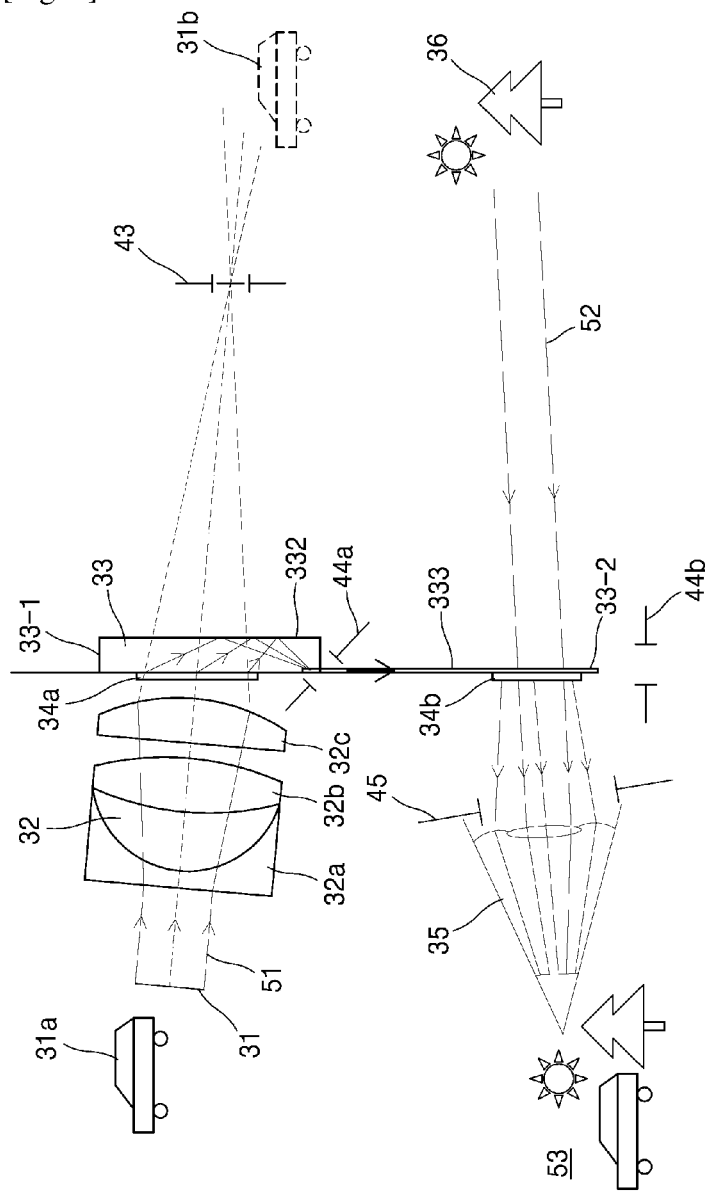
[Fig. 4]
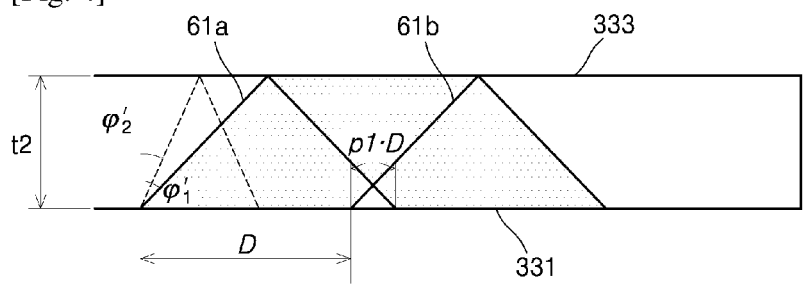

[Fig. 5]
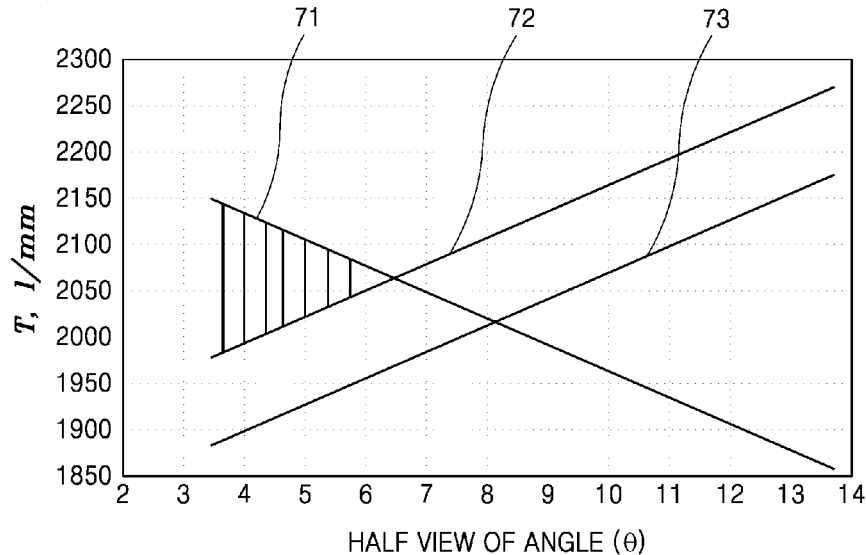
$\alpha = 0$; $t_2 = 0.7$ mm; $D = 2$ mm;
$p1 = 0\%$; $p2 = 40\%$; $\theta_{max} = \pm 6.5°$
[Fig. 6]
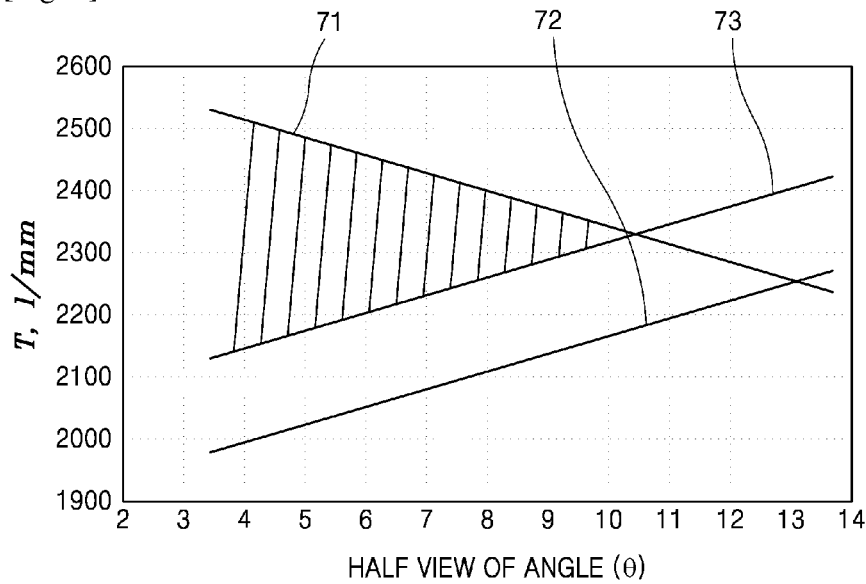
$\alpha = 0$; $t_2 = 0.3$ mm; $D = 2$ mm;
$p1 = 0\%$; $p2 = 65\%$; $\theta_{max} = \pm 10.5°$

[Fig. 7]
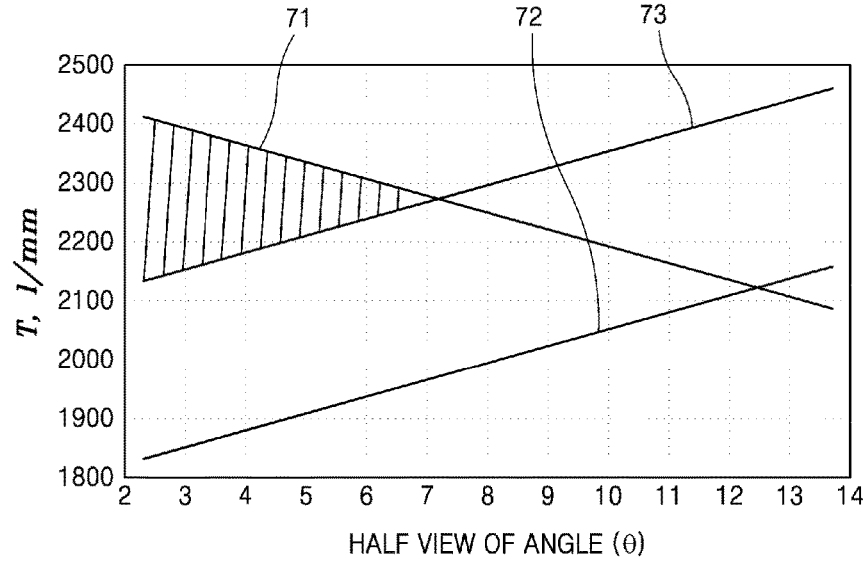
$\alpha = 4°$; $t_2 = 0.7$ mm; $D = 3$ mm;
$p1 = 0\%$; $p2 = 45\%$; $\theta_{max} = \pm 7.4°$
[Fig. 8]
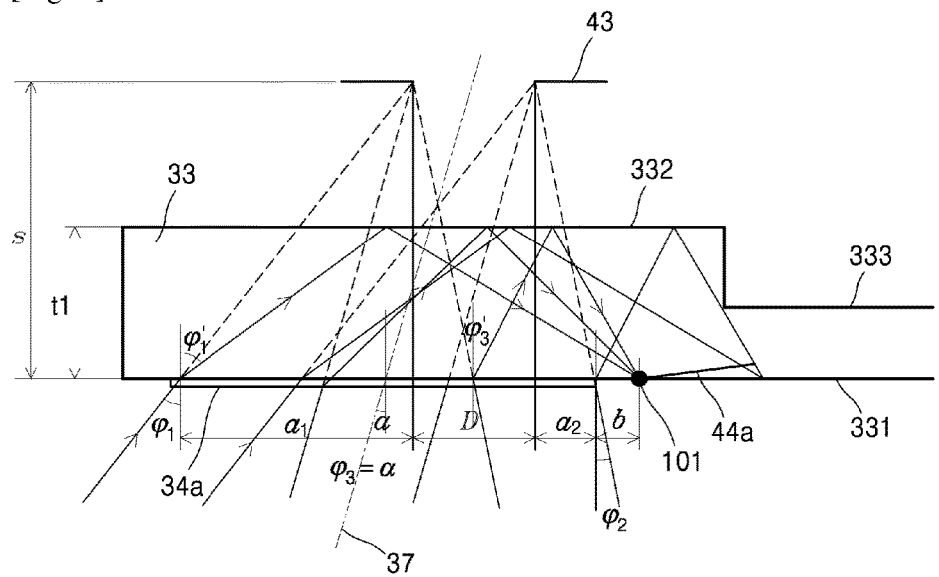

[Fig. 9]
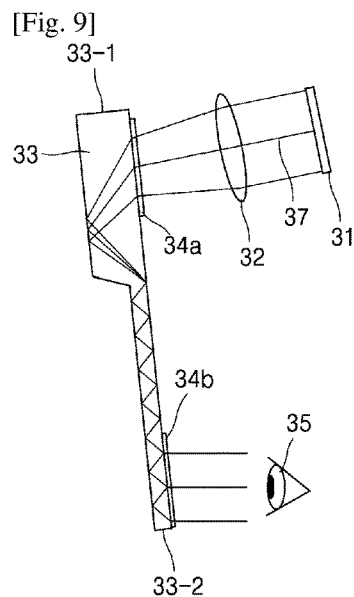
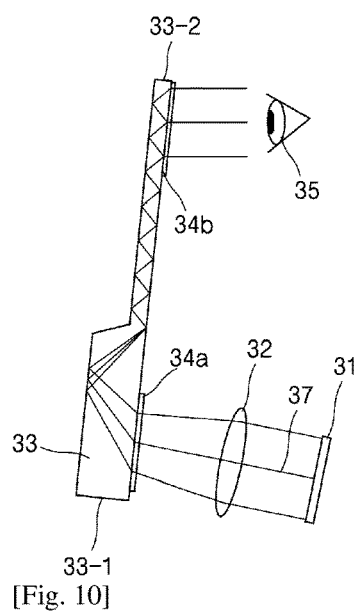
[Fig. 10]
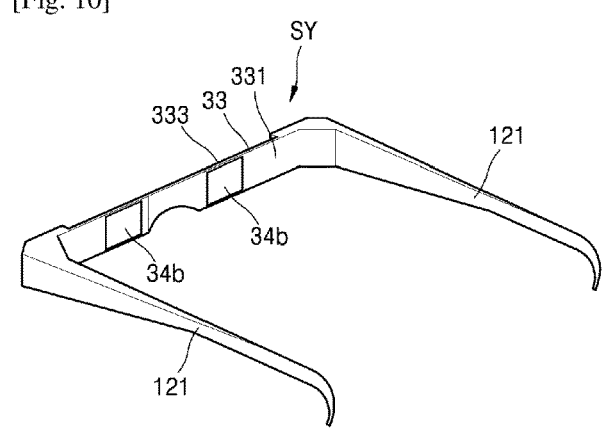

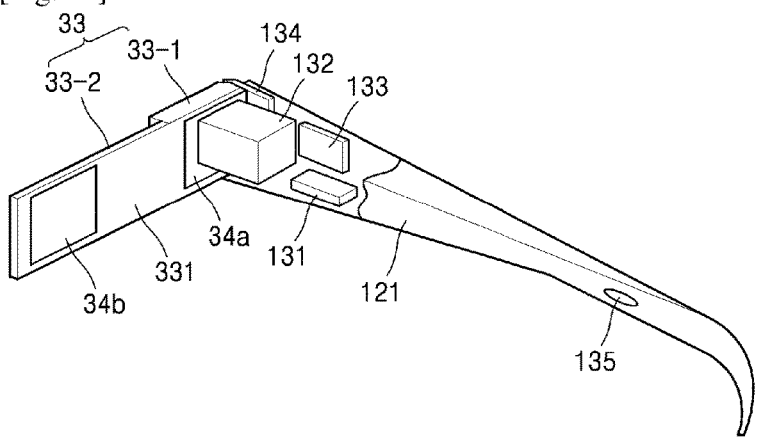
[Fig. 11]
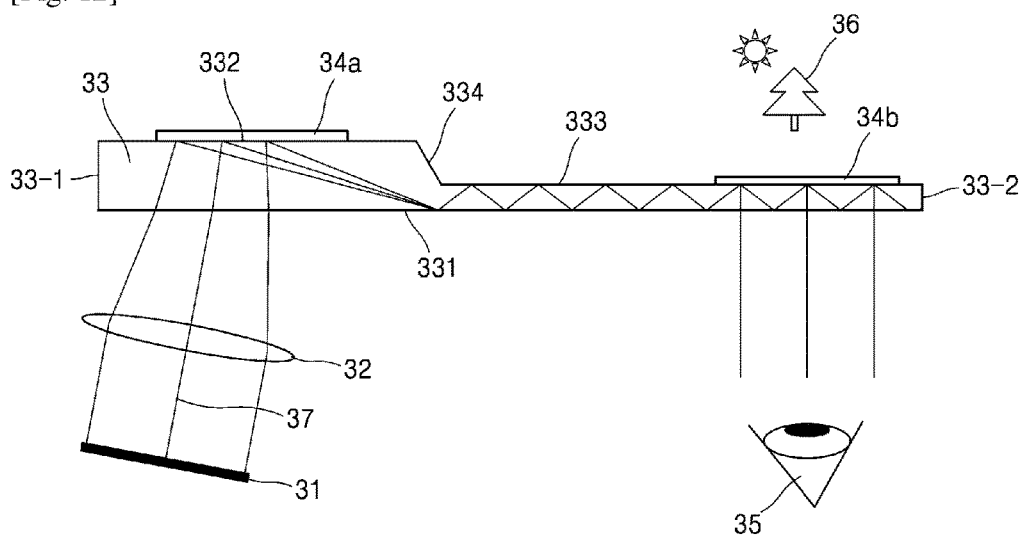
[Fig. 12]
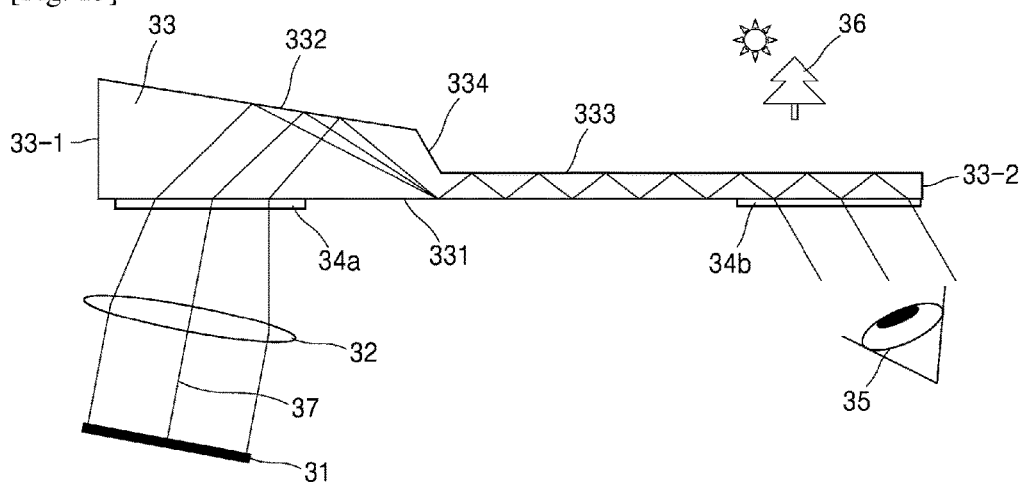
[Fig. 13]

[Fig. 14]
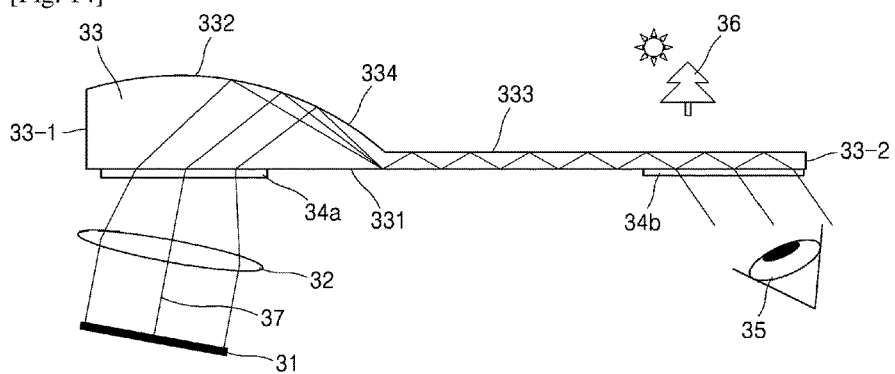
[Fig. 15]
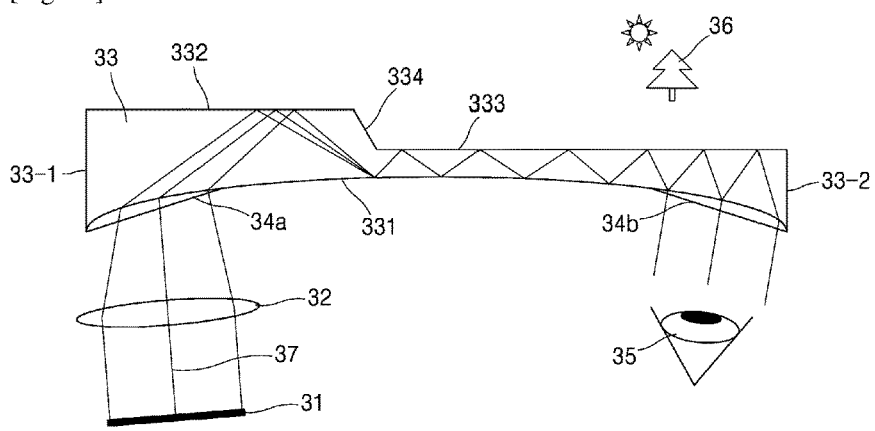
[Fig. 16]
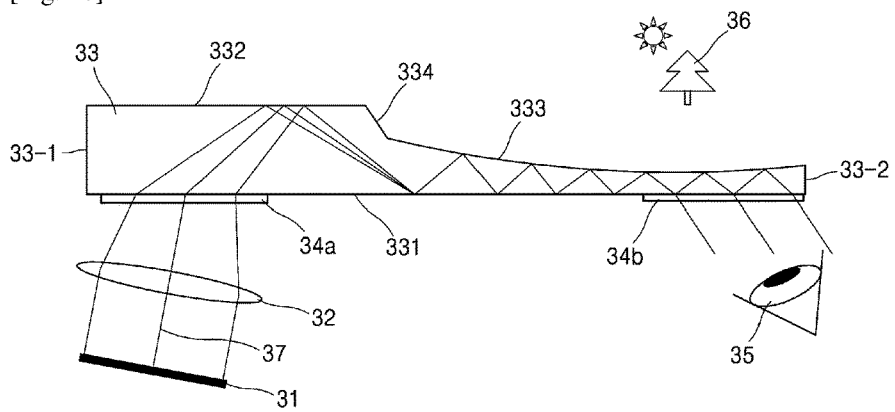
[Fig. 17]
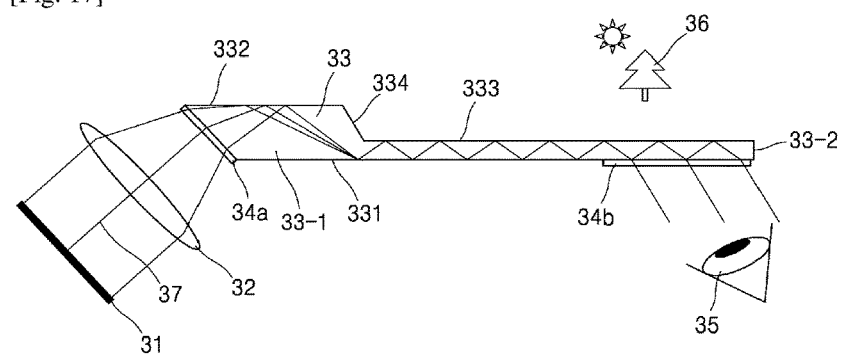

[Fig. 18]
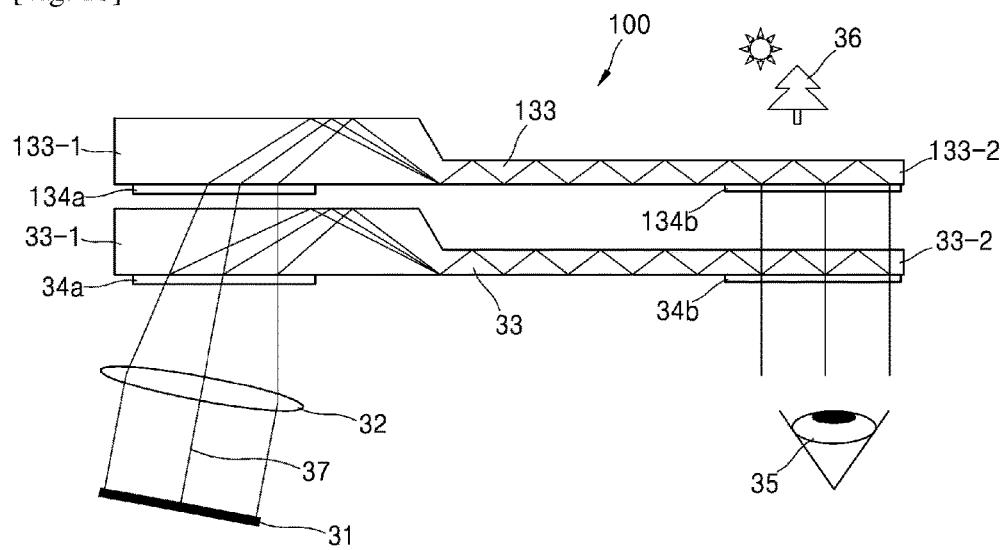
[Fig. 19]
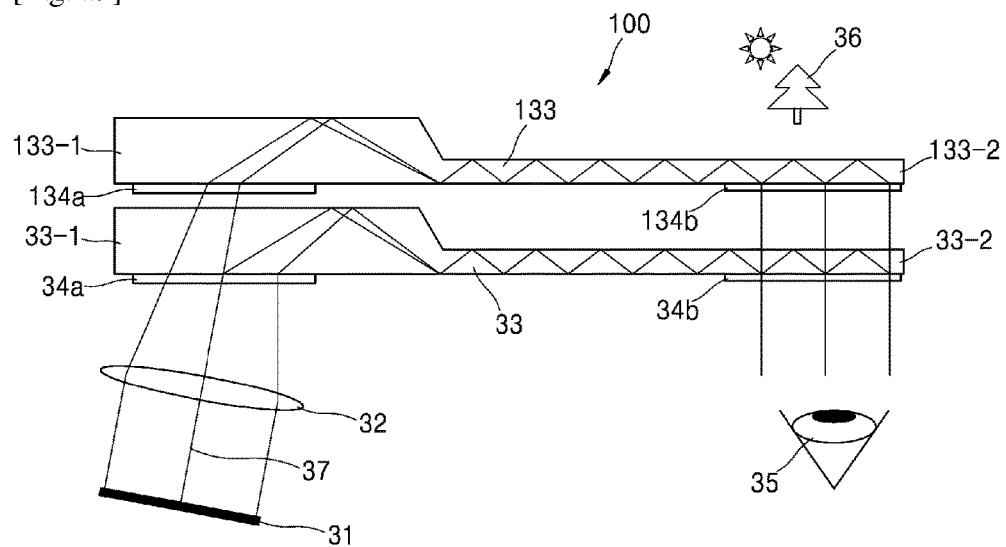
[Fig. 20]
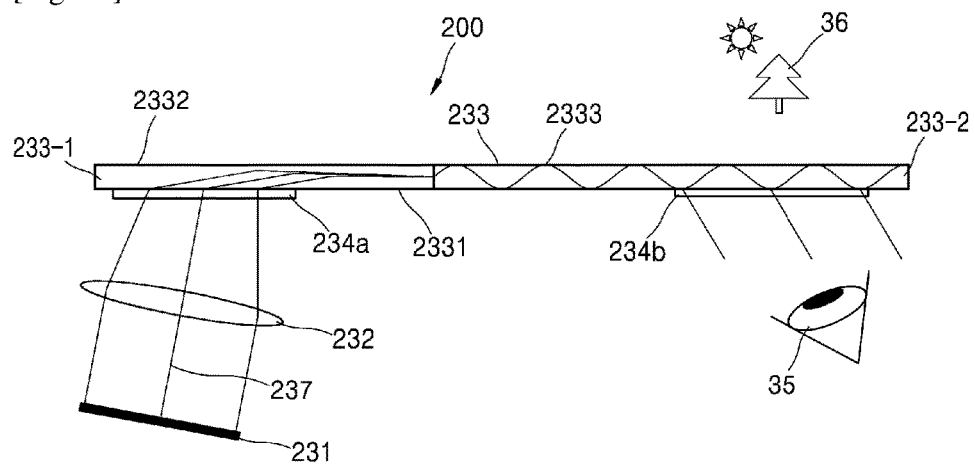

HOLOGRAPHIC SEE-THROUGH OPTICAL DEVICE, STEREOSCOPIC IMAGING SYSTEM, AND MULTIMEDIA HEAD MOUNTED SYSTEM

TECHNICAL FIELD

One or more exemplary embodiments relate to an optical system, and more particularly, to a holographic see-through optical device for displaying a combination of a virtual image and a see-through view, a stereoscopic imaging system including the same, and a multimedia head mounted system.

BACKGROUND ART

Most of the known optical devices of augmented reality are based on a combination of eyepiece eyepieces to enlarge an image formed by LCDs, LCoSs, CRTs, OLEDs, or other spatial light modulators having compact size and image combiners are based on, for example, a beam-splitting cube or a semitransparent plate. In some optical devices of augmented reality that reduce the size of a device, a scanning module is used, wherein a two-dimensional image is formed by sequentially field scanning by narrow beam. The disadvantage of these systems is the need for high-precision micro-mechanical actuators.

DISCLOSURE OF INVENTION

Technical Problem

A flat waveguide is used in an optical device of augmented reality, where it is preferable for a system to be operated by a single light beam for light expansion. However, an imaging system used in an optical device of augmented reality is operated by a number of light beams corresponding to different fields of view. When a wave propagates in a waveguide, light beams may overlap each other or a gap may be formed between beam projections on the major surface of the waveguide. In this case, the brightness of an image may not be uniform.

Solution to Problem

One or more exemplary embodiments include a holographic see-through optical device for displaying a combination of a virtual image and a see-through view, a stereoscopic imaging system including the same, and a multimedia head mounted system.

Additional aspects will be set forth in part in the description which follows and, in part, will be apparent from the description, or may be learned by practice of the presented exemplary embodiments.

According to one or more exemplary embodiments, a holographic see-through optical device includes a micro display; a relay optical system, which relays an image generated by the micro display; at least one waveguide including at least two portions having different thicknesses or different refractive indexes; at least one first holographic optical element, which is arranged at one of the two portions; and at least one second holographic optical element, which is arranged at the other one of the two portions.

a portion of the waveguide to which the image generated by the micro display is incident has a greater thickness that the other portion of the waveguide.

at least one of thickness or reflectivity of the portion of the waveguide to which the image generated by the micro display is incident are set to diffract light beams on the first holographic optical element.

portions of the waveguide have gradient refractive indexes.

the relay optical system forms an image of the micro display at the infinite distance.

the waveguide includes a plurality of major surfaces, and the major surfaces includes one common bottom surface, top surfaces facing the bottom surface, and a interface surface at which the respective portions of the waveguide meet each other.

the optical axis of the relay optical system is tilted with respect to a line perpendicular to the bottom surface of the waveguide.

at least one of major surfaces of the waveguide is a flat surface or a free-formed surface.

the at least one of first and second holographic optical elements have different wavelength selectivity.

the at least one of first and second holographic optical elements have different angle selectivity.

a light beam propagated in a waveguide is incident to a second holographic optical element, is partially diffracted, and partially returns to and reflected by a major surface of the waveguide, and the mutual interaction is repeated at least twice.

at least two waveguides are stacked.

According to one or more exemplary embodiments, a holographic see-through optical device includes a micro display; a relay optical system, which relays an image generated by the micro display; a waveguide including a first portion having a first thickness and a second portion having a second thickness; a first holographic optical element arranged at the first portion; and a second holographic optical element arranged at the second portion, wherein the relay optical system forms an exit pupil at a location apart from the first portion of the waveguide, the first holographic optical element combines light beams at the first portion of the waveguide and relays the exit pupil to a region at which the first portion and the second portion of the waveguide meet each other, and the second holographic optical element combines light beams from the waveguide and relays the exit pupil at a location apart from the second portion of the waveguide.

an average thickness of the first portion of the waveguide is greater than an average thickness of the second portion.

According to one or more exemplary embodiments, a stereoscopic imaging system in which any of the holographic see-through optical devices are arranged at eyes of a viewer, respectively.

According to one or more exemplary embodiments, a multimedia head mounted system enabling a user to watch surrounding environment combined with displayed content, the multimedia head mounted system includes a micro display, which generates an image; a relay optical system, which relays an image generated by the micro display; at least one waveguide including at least two portions having different thicknesses or different refractive indexes; at least on first holographic optical element arranged; at least one of x second holographic optical element; an integrated processor for handling content to be displayed to the user; and earpieces to be mounted on the head of the user, wherein an exit pupil is formed at a location apart from the first portion of the waveguide, the first holographic optical element combines light beams at the first portion of the waveguide and relays the exit pupil to a region at which the first portion and the second portion of the waveguide meet each other, the exit pupil propagates in the second portion of the waveguide via total internal reflection to retransmit light beams, and the second holographic optical element combines light beams from the waveguide and relays the exit pupil at a location apart from the second portion of the waveguide.

BRIEF DESCRIPTION OF DRAWINGS

These and/or other aspects will become apparent and more readily appreciated from the following description of the exemplary embodiments, taken in conjunction with the accompanying drawings in which:

FIG. 1 is a diagram showing a layout of a holographic see-through optical device according to an embodiment;

FIG. 2 is a perspective view of the holographic see-through optical device;

FIG. 3 is a diagram showing an example that a relay optical system of the holographic see-through optical device according to an embodiment include three components;

FIG. 4 is a diagram showing a thin portion (second portion) of a waveguide of the holographic see-through optical device according to an embodiment;

FIGS. 5, 6, and 7 are diagrams showing relationships between half fields of view o flight beams incident to the waveguide of the holographic see-through optical device according to an embodiment and grating frequencies of the holographic see-through optical device;

FIG. 8 is a diagram showing a thick portion (first portion) of a waveguide of the holographic see-through optical device according to an embodiment;

FIG. 9 is a diagram showing an example in which the holographic see-through optical devices according to an embodiment are used with respect to both eyes of a viewer;

FIG. 10 is a diagram showing an example in which the holographic see-through optical device according to an embodiment is embodied as an eyeglasses-type device;

FIG. 11 is a diagram showing an example in which the holographic see-through optical device according to an embodiment is arranged at the right portion of an eyeglass;

FIG. 12 is a diagram showing an example in which locations of first and second holographic optical elements of the holographic see-through optical device according to an embodiment are changed;

FIG. 13 is a diagram showing an example in which the first portion (thick portion) of the waveguide of the holographic see-through optical device according to an embodiment has a tilted surface;

FIG. 14 is a diagram showing an example in which the first portion (thick portion) of the waveguide of the holographic see-through optical device according to an embodiment has a surface that is convex upward;

FIG. 15 is a diagram showing an example in which a surface of the waveguide of the holographic see-through optical device according to an embodiment has a concave surface;

FIG. 16 is a diagram showing an example in which the second portion (thin portion) of the waveguide of the holographic see-through optical device according to an embodiment has a concave surface;

FIG. 17 is a diagram showing an example in which the relay optical system of the holographic see-through optical device according to an embodiment is arranged at a side of the waveguide;

FIGS. 18 and 19 are diagram showing examples in which the holographic see-through optical device according to an embodiment includes two waveguides; and FIG. 20 is a diagram showing an example in which the holographic see-through optical device according to an embodiment includes a waveguide including two portions with different refractive indexes.

MODE FOR THE INVENTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

In the drawings, the thicknesses of layers and regions are exaggerated for clarity. It will also be understood that when a layer is referred to as being "on" another layer or substrate, it can be directly on the other layer or substrate, or intervening layers may also be present. Like reference numerals in the drawings denote like elements, and thus their description will be omitted.

FIG. 1 is a top view of a holographic see-through optical device according to an embodiment, and FIG. 2 is a perspective view of the holographic see-through optical device.

The holographic see-through optical device includes a micro display 31, a relay optical system 32, and a waveguide 33. The micro display 31 may generate an image. The micro display 31 may form a light beam with small divergence. The relay optical system 32 may form an exit pupil 43 apart from the waveguide 33. For example, the relay optical system 32 may include at least one lens. FIG. 1 shows an example in which the relay optical system 32 includes one lens. The optical axis of the relay optical system 32 may be tilted with respect to a line perpendicular to the bottom surface of the waveguide 33.

The waveguide 33 may include a plurality of portions having different thicknesses. For example, FIG. 1 shows an example in which the waveguide 33 includes a first portion 33-1 and a second portion 33-2, wherein the first portion 33-1 has a different thickness than second portion 33-2. The first portion 33-1 may have a first thickness t1 and the second portion 33-2 may have a second thickness t2, where the second thickness t1 may be smaller than the first thickness t1. In other words, a first portion of the waveguide 33 at a side of the waveguide 33 to which a light is incident may have a greater thickness than a second portion of the waveguide 33 at the other side of the waveguide 33. Here, a region via which an image generated by the micro display 31 is incident to the waveguide 33 may be referred to as an incoupling region, whereas a region via which a light beam is transmitted via the waveguide 33 and output may be referred to as an outcoupling region. A thickness of the first portion 33-1 in the incoupling region of the waveguide 33 may be greater than that of the second portion 33-2 in the outcoupling region.

Although an example in which the waveguide 33 includes two portions respectively having first and second thicknesses is described above, the inventive concept is not limited thereto, and the waveguide 33 may include a first portion having a first thickness, a second portion having a second thickness, and a third portion having a third thickness. Alternatively, the waveguide 33 may include at least two portions having different refractive indexes. Detailed descriptions thereof will be given below. Meanwhile, the thickness may be a thickness of a cross-section in a direction perpendicular to a direction in which a light propagates in the waveguide 33.

A first holographic optical element 34a may be located at the first portion 33-1 of the waveguide 33. For example, the first holographic optical element 34a may be located on the bottom surface of the first portion 33-1 of the waveguide 33. However, the inventive concept is not limited thereto, and the first holographic optical element 34a may be located on another surface of the waveguide 33. A second holographic optical element 34b may be located on the bottom surface of the second portion 33-2. However, the inventive concept is not limited thereto, and the second holographic optical element 34b may be located on another surface of the waveguide 33.

Referring to FIGS. 1 and 2, the waveguide 33 may include a plurality of major surfaces. The plurality of major surfaces may include a first surface 331, which is the common bottom surface of the first portion 33-1 and the second portion 33-2, a second surface 332, which is the top surface of the first portion 33-1, and a third surface 333, which is the top surface of the second portion 33-2. Furthermore, the plurality of major surfaces may further include a fourth surface 334 where the first portion 33-1 meets the second portion 33-2. The fourth surface 334 may be a tilted surface to the second surface 332 and the third surface 333, as shown in FIG. 1. However, the fourth surface 334 is not limited thereto and may be a surface perpendicular to the second surface 332 and the third surface 333.

For example, the first holographic optical element 34a may be arranged on the first surface 331 of the first portion 33-1, whereas the second holographic optical element 34b may be arranged on the first surface 331 of the second portion 33-2. The first holographic optical element 34a and the second holographic optical element 34b may be transmissive elements.

At least one of the thickness and reflectivity of the first portion 33-1 may be set to diffract light beams on the first holographic optical element 34a. After total internal reflection, light beams may travel toward the second portion 33-2 without reflecting from the second surface 332 to the first holographic optical element 34a.

Beam diffraction on the first holographic optical element 34a may cause the first exit pupil 43 to relay beams to two surfaces. The two surfaces include the optical axis of the relay optical system 32 and may include a tangential surface 41 perpendicular to the first, second, and third surfaces 331, 332, and 333 and a sagittal surface 42 perpendicular to the tangential surface 41. It minimizes gaps and overlaps between light beams when the light beams propagate in the second portion 33-2 (thin portion) of the waveguide 33. The second holographic optical element 34b may combine light beams from the waveguide 33 and relay portions of second and third exit pupils 44a and 44b at a single surface.

Meanwhile, a light beam that propagates in a waveguide may be incident to a second holographic optical element, may be partially diffracted, and may partially fall back onto and reflected by a major surface of the waveguide, where the mutual interaction may be repeated at least twice.

FIG. 3 is a diagram showing an optical device according to another embodiment. In the optical device shown in FIG. 3, the relay optical system 32 may include a first, second, and third components, for example, first, second, and third lenses 32a, 32b, and 32c. The relay optical system 32 may further include an eyepiece or a collimating lens. Compared to the optical device shown in FIG. 1, components other than the relay optical system 32 may be substantially identical to those of the optical device shown in FIG. 1. For example, the relay optical system 32 may include the first, second, and third lenses 32a, 32b, and 32c. For example, the field of view of the relay optical system 32 may be about 15 degrees, the effective focal distance of the relay optical system 32 may be about 38.2 mm, and the first exit pupil 43 may be located about 57 mm apart from the third lens 32c. The waveguide 33 may be formed of BK7 glass, for example. The thickness of the first portion 33-1 of the waveguide 33 may be about 4.8 mm, whereas the thickness of the second portion 33-2 of the waveguide 33 may be about 0.7 mm. Grating frequency of the first and second holographic optical elements 34a and 34b may be 2280 (l/mm). Size of the first exit pupil 43 may be about 3.5×3.0 mm.

The micro display 31 may generate an image 31a. A light beam 51 from the micro display 31 is incident to the relay optical system 32. The relay optical system 32 may form an image 31b of the micro display 31 at an infinite distance and form the first exit pupil 43 at a location about 48 mm apart from the second surface 332. The first holographic optical element 34a combines the light beam 51 at the first portion (thick portion) of the waveguide 33. At the same time, the second surface 332 and the first holographic optical element 34a relay the first exit pupil 43 to a tangential surface (41 of FIG. 2) at a first location (a second exit pupil) 44a of the waveguide 33, e.g., at a region where the first portion 33-1 (thick portion) meets the second portion 33-2 (thin portion) and a tangential surface (42 of FIG. 2) at a second location (a third exit pupil) 44b that is a designated distance apart from the waveguide 33. The light beam 51 propagates in the second portion 33-2 (thin portion) of the waveguide 33 due to total internal reflection. The second holographic optical element 34b combines the light beams 51 propagated in the waveguide 33 and, at the same time, 1) combines images of the second exit pupil 44a and the third exit pupil 44b at a location corresponding to a pupil 35 and 2) expands the first exit pupil 43.

Due to the expansion of the first exit pupil 43, the pupil 35 may be filled with an image as shown in FIG. 3. When the light beam 51 is incident to the second holographic optical element 34b, the light beam 51 is partially diffracted at the second holographic optical element 34b and partially reflected. The reflected light beam propagates toward a third surface 333 of the waveguide 33 and, when total internal reflection occurs, the light beam is partially diffracted and partially reflected and returns to the second holographic optical element 34b. The process may be repeated for a couple of times. As a result, an exit pupil may be expanded. The phenomenon is referred to as pupil multiplication.

The light beam 51 is incident to the pupil 35 of a viewer and forms an image of the micro display 31 on a retina. At the same time, a light beam 52 from a surrounding environment 36 passes through the second portion 33-2 (thin portion) of the waveguide 33 and forms an image of the surrounding environment 36 on the retina. Accordingly, a combined image 53 is formed on the retina.

The first and second holographic optical elements 34a and 34b may be formed of a sinusoidal grating or a stepped-like grating. Relief lines of the first and second holographic optical elements 34a and 34b may be parallel to each other. Here, a relief line may include a line interconnecting the uppermost peak of a sine curve and the lowermost curve of the sine curve. Furthermore, the first and second holographic optical elements 34a and 34b may have optical powers. The optical powers may compensate aberration of the relay optical system 32. Furthermore, diffraction efficiency of the second holographic optical element 34b may be provided such that brightness uniformity of an image increase along a direction in which a light beam propagates.

An embodiment in which the locations of pupils are provided by different thicknesses of at least two portions of a waveguide, e.g., a first portion and a second portion, will be described below. Light beam propagation in the second portion 33-2 (thin portion) of the waveguide will be described below. The thin portion of the waveguide is shown in FIG. 4. In FIG. 4, a gray-filled portion indicates a light beam propagating in the waveguide at an angle above an angle φ1' related to the maximum field of view φ1 at which the light beam is incident from the first portion 33-1 (thick portion). To avoid gaps in an image, a first marginal ray 61a (after being reflected by the third surface 333) and a second marginal ray 61b (after being reflected by the first surface 331) intersect each other at a point on the first surface 331. Otherwise, gaps or overlaps may be formed in pupils. A percentage of an acceptable gap with respect to a pupil size D will be referred to as p1, whereas a percentage of an acceptable overlap with respect to a pupil size D will be referred to as p2. Based on geometrical consideration, conditions related to an acceptable gap and an acceptable overlap may be expressed as the inequalities shown below.

$$tg\varphi_1' < \frac{D + p_1 \cdot D}{2t_2};$$ (1)

$$tg\varphi_2' > \frac{D + p_2 \cdot D}{2t_2},$$

Here, the second thickness t2 denotes the thickness of the second portion 33-2 (thin portion) of the waveguide 33, and φ1' and φ2' denote angles at which light beams propagate in the waveguide 33. A relationship between φ1' and φ2' and fields of view φ1 and φ2 is shown as a grating equation below.

$$T\lambda = n \sin \varphi' - \sin \varphi$$ (2)

Here, T denotes a grating frequency, λ denotes a wavelength of a light beam, η denotes refractive index of the waveguide, φ corresponds to φ1 or φ2, and φ' corresponds to φ1' and φ2'. The fields of view φ1 and φ2 may be defined as shown below.

$$\varphi_1 = \alpha + \Theta;$$

$$\varphi_2 = \alpha - \Theta,$$ (3)

Here, Θ denotes a half field of view and α denotes an angle between a first axis 37 of the relay optical system 32 (refer to FIG. 1) and a second axis perpendicular to the first surface 331.

The below inequalities may be obtained based on the Inequalities (1), the grating equation (2), and conditions of total internal reflection.

$$\begin{cases} T < \frac{n \sin \varphi_1' - \sin \varphi_1}{\lambda}; \\ T > \frac{n \sin \varphi_2' - \sin \varphi_2}{\lambda}; \\ T > \frac{n \sin \varphi_{TIR}' - \sin \varphi_2}{\lambda} \end{cases}$$ (4)

Here, φ'$_{TIR}$ denotes a critical angle or an angle at which total internal reflection occurs. The critical angle may be defined as shown below.

$$\varphi_{TIR}' = \arcsin\left(\frac{1}{n}\right)$$ (5)

The solution of the system of inequalities above provide optimal t2, T, α, p1, p2, D, and Θ. Some solutions may be shown in FIGS. 5, 6, and 7. The solution regions are hatched in FIGS. 5, 6, and 7. Lines 71, 72, 73 show relationships between grating frequency and half field of view. The line 71 is the uppermost line of a grating frequency that allows propagation of a light beam in the waveguide at p1·D$_{gap}$. The line 71 corresponds to the first expression in the system of inequalities (4). The line 72 is the lowermost line of a grating frequency that allows propagation of a light beam in the waveguide at an angle above an angle smaller than the critical angle. The line 72 corresponds to the third expression in the system of inequalities (4). The line 73 is the lowermost line of grating frequency that allows propagation of a light beam in the waveguide with at p2·D$_{overlap}$. The line 73 corresponds to the second expression in the system of inequalities (4). The thin portion may have a thickness from about 25 mm to about 40 mm.

Light beam propagation through the first portion 33-1 (thick portion) of the waveguide 33. The first portion 33-1 (thick portion) of the waveguide 33 is shown in FIG. 8. To avoid or minimize several light beams incident to the first holographic optical element 34a, it is necessary for light beams from marginal fields to be traced to first points 101 out of the first holographic optical element 34a. To form the second exit pupil 44a (corresponding to the intermediate pupil), it is necessary to approximately coincide the first points 101 to one another. Based on geometrical considerations, the below relationships may be obtained.

$$\varphi_1' = \arctan\frac{a_1 + a_2 + D + b}{2t_2};$$ (6)

$$\varphi_2' = \arctan\frac{D + b}{2t_2};$$

$$\varphi_3' = \arctan\frac{a_2 + a_3 + D + b}{2t_2},$$

Here, φ3 denotes an angle at which the chief ray of the central field strikes the first surface 331, φ3=α, t2 denotes a thickness of the first portion (thick portion), b denotes an offset of the first point 101 from the first holographic optical element 34a, a1, a2, and a3 denote projection distances of marginal rays and chief rays onto the first surface 331. The relationships between a1, a2, and a3 and the distance s between the first surface 331 and location of the first exit pupil 43 are as follows:

$$a_1 = s \cdot tg\varphi_1;$$

$$a_2 = s \cdot tg\varphi_2;$$

$$a_3 = s \cdot tg\varphi_3.$$ (7)

The below system of equations may be obtained by substituting a1, a2, and a3 in (6) with the system of equations (7) and substituting the system of equations (6) in the grating equation (2).

$$\begin{cases} \lambda T = n \cdot \sin \varphi'_1 - \sin \varphi_1; \\ \lambda T = n \cdot \sin \varphi'_2 - \sin \varphi_2; \\ \lambda T = n \cdot \sin \varphi'_3 - \sin \varphi_3 \end{cases} \quad (8)$$

The solution of the system of equalities (8) regarding T provides a grating frequency providing rays from marginal fields, the rays to be traced from the first holographic optical element 34a to the first point 101. Furthermore, an optimal thickness t2 and an optimal location s of the first exit pupil 43 may be provided. It is important to check whether the solution of the system of equalities (8) is within the solution region of inequalities (4). Otherwise, it is necessary to solve the system of inequalities (4) and the system of equalities (8) simultaneously.

The length $l_2$ of the first portion (thick portion) may be approximated as shown below:

$$l_2 = a_1 + D + a_2 + b. \quad (9)$$

Solutions of the system of equations and inequalities (4) and (8) and FIGS. 5 through 7 show that the optimal thickness of the first portion (thick portion) may be from about 3 mm to about 6 mm and a grating frequency may be from about 2000 (l/mm) to about 2500 (l/mm) when the diameter of an exit pupil of a relay optical system is from about 2 mm to about 3 mm.

Application of the waveguide including a thick portion and a thin portion having an intermediate exit pupil between them reduces the number of first holographic optical elements without a significant reduction of the size of an exit pupil by using pupil multiplication due to the second holographic optical element 34b.

As shown in FIG. 9, a holographic see-through optical device according to an embodiment may be used in front of both eyes of a viewer. By using a holographic see-through optical device in front of both eyes of a viewer, a stereoscopic imaging system displaying stereoscopic images may be embodied. Furthermore, the holographic see-through optical device may be mounted on the head of a user and embodied as a multimedia head mounted system. FIG. 10 shows a system SY including a mount and earpieces 121. The system is embodied as an eyeglasses-type device. The right portion of the eyeglasses is shown in FIG. 11. The system SY may include an optical module 132, an integrated processor 131, a radio interface 133, an optical interface 134, and an acoustical interface 135. The above-stated components may be embedded in the earpieces of the system SY. The optical module 132 may include the micro display 31 and the relay optical system 32 as shown in FIG. 1. The optical module 132 may be combined with the first holographic optical element 34a. Since the waveguide 33 and the second holographic optical element 34b are substantially identical to those described above with reference to FIG. 1, detailed descriptions thereof will be omitted below.

The integrated processor 131 may handle interactive content to be displayed to a user. The radio interface 133 may receive or transmit interactive content via radio waves. The acoustical interface 135 may collect or relay interactive content. The acoustical interface 135 may be embodied as a camera, a camcorder, or a projection lens, for example. The acoustical interface 135 may receive or transmit interactive content via acoustical waves. The acoustical interface 135 may be embodied as a microphone, a dynamic transducer, or a bone conduction transducer.

In an optical device shown in FIG. 12, the first holographic optical element 34a may be arranged on the second surface 332 of the first portion 33-1 of the waveguide 33, whereas the second holographic optical element 34b may be arranged on the third surface 333 of the second portion 33-2. Here, the first holographic optical element 34a and the second holographic optical element 34b may be embodied as reflective elements. Meanwhile, the fourth surface 334 may be arranged at a region where the first portion 33-1 meets the second portion 33-2. The fourth surface 334 may be a tilted surface tilted with respect to the third surface 333.

A reflective holographic optical element may be used instead of a transmissive holographic optical element without changing an operation principle.

FIG. 13 shows an example in which the second surface 332 of the first portion 33-1 of the waveguide 33 is not parallel to the first surface 331. The second surface 332 of the first portion 33-1 may be embodied as a tilted surface tilted with respect to the first surface 331. The second surface 332 may have a shape that the height of the second surface 332 decreases from the first portion 33-1 toward the second portion 33-2. In other words, the thickness of the first portion 33-1 may not be uniform. Although an example in which thickness of the first portion 33-1 is not uniform is shown, the thickness of the second portion 33-2 may not be uniform. If the thickness of at least one of the first portion 33-1 and the second portion 33-2 is not uniform, the average thicknesses of the respective portions may be utilized. For example, an average thickness of the first portion 33-1 may be greater than an average thickness of the second portion 33-2. Meanwhile, average thicknesses may also be applied even when thicknesses of the portions are uniform.

Although FIG. 13 shows an example in which the first and second holographic optical elements 34a and 34b are embodied as transmissive elements, the first and second holographic optical elements 34a and 34b may also be embodied as reflective elements. In other words, the first holographic optical element 34a may be arranged on the second surface 332 of the first portion 33-1, whereas the second holographic optical element 34b may be arranged on the third surface 333 of the second portion 33-2.

FIG. 14 shows an embodiment in which the second surface 332 of the first portion 33-1 is embodied as a free-form surface. The second surface 332 of the first portion 33-1 may have a curved shape. In this case, the fourth surface 334 may have a curved shape extending from the second surface 332. For example, the second surface 332 of the first portion 33-1 may have a convex surface. Alternatively, the second surface 332 of the first portion 33-1 may have a concave surface.

FIG. 15 shows an example in which the first surface 331 is formed as a free-form surface. If the first surface 331 is a free-form surface, the first holographic optical element 34a and the second holographic optical element 34b may have shapes corresponding to that of the first surface 331.

In FIG. 16, the third surface 333 of the second portion 33-2 may be a free-form surface. In this regard, size reduction and optical efficiency improvement may be embodied by changing shape of at least one of the first through fourth surfaces 331, 332, 333, and 334.

Alternatively, for convenience of spatial arrangement, the first holographic optical element 34a may be arranged on a side surface of the first portion 33-1 of the waveguide 33 as shown in FIG. 17. Next, the micro display 31 and the relay optical system 32 may be arranged to face the first holographic optical element 34a. The arrangement structure may be referred to as a side incoupling structure. As described above, various modifications may be made in shape of the waveguide and arrangements of the first and second holographic optical elements.

FIG. 18 is a diagram showing an optical device 100 according to another embodiment.

The optical device 100 shown in FIG. 18 includes a plurality of waveguides. For example, the optical device 100 may include a micro display 31, a relay optical system 32, a first waveguide 33, and a second waveguide 133.

The micro display 31, the relay optical system 32, and the first waveguide 33 are substantially identical to those described above with reference to FIG. 1, detailed descriptions thereof will be omitted below.

The second waveguide 133 may include a relatively thick third portion 133-1 and a relatively thin fourth portion 133-2. The second waveguide 133 may include a 1-1 surface 1331, which is the bottom surface of the third portion 133-1 and the fourth portion 133-2, a 1-2 surface 1-2, which is the top surface of the third portion 133-1, a 1-3 surface 1333, which is the top surface of the fourth portion 133-2, and a 1-4 surface 1334, where the third portion 133-1 meets the fourth portion 133-2. A third holographic optical element 134a may be arranged on the 1-1 surface 1331 of the third portion 133-1, whereas a fourth holographic optical element 134b may be arranged on the 1-1 surface 1331 of the fourth portion 133-2. The third and fourth holographic optical element 134a and 134b may be transmissive element. Alternatively, the third and fourth holographic optical element 134a and 134b may be reflective elements, where various modifications may be made in locations and shapes thereof. The modified embodiments of the waveguide 33 and the first and second holographic optical elements 34a and 34b described above with reference to FIGS. 12 through 17 may also be applied to the second waveguide 133.

The first through fourth holographic optical elements 34a, 34b, 134a, and 134b may be wavelength-selective holographic optical elements. The first through fourth holographic optical elements 34a, 34b, 134a, and 134b may be multicolor holographic optical elements. For example, the first through fourth holographic optical elements 34a, 34b, 134a, and 134b may perform holographic process with respect to light beams of a designated wavelength band and transmit or reflect light beams of other wavelength bands.

Image quality may be improved by reducing lateral colors aberration and color ghosts by arranging at least two stacked waveguides. Alternatively, as shown in FIG. 19, angle-selective holographic optical elements may be used as the first through fourth holographic optical elements 34a, 34b, 134a, and 134b, thereby increasing field of view.

FIG. 20 is a diagram showing a see-through optical device 200 according to another embodiment. The see-through optical device 200 may include a micro display 231, a relay optical system 232 that relays an image generated by the micro display 231, and at least one waveguide 233 including at least two portions. The waveguide 233 may include a plurality of portions having different refractive indexes. The waveguide 233 may include a first portion 233-1 and a second portion 233-2, where refractive index of the first portion 233-1 may be different from that of the second portion 233-2. Alternatively, the waveguide 233 may have gradient refractive index.

A first holographic optical element 234a may be arranged at the first portion 233-1 of the waveguide 233, whereas a second holographic optical element 234b may be arranged at the second portion 233-2. The waveguide 233 may include a plurality of major surfaces. The plurality of major surfaces may include a first surface 2331, which is the common bottom surface of the first portion 233-1 and the second portion 233-2, a second surface 2332, which is the top surface of the first portion 233-1, and a third surface 2333, which is the top surface of the second portion 233-2. Furthermore, the plurality of major surfaces may further include a fourth surface 2334 at a region where the first portion 233-1 meets the second portion 233-2. The first holographic optical element 234a may be arranged on the first surface or the second surface, whereas the second holographic optical element 234b may be arranged on the first surface or the third surface. Brightness uniformity of an image may be improved by allowing light beams to propagate in a plurality of portions of the waveguide with different refractive indexes. An image generated by the micro display 231 and an image of the surrounding environment 36 may be viewed together via the see-through optical device 200.

An holographic optical device according to an embodiment may be applied to an exhibition center, a museum, a concert and a sport hall, a stadium, a sport venues, an automobile, a game, a simulation system, and other locations for viewing not only virtual 2-dimensional images formed by an embedded micro display but also actual images of surrounding environments.

An augmented reality device may be applied to a helmet or an eyeglass and may be arranged to locate holographic see-through optical devices at the respective eyes of a user. Alternatively, a holographic see-through optical device may be embodied as a monocular-type device that is arranged just in front of an eye and includes an embedded micro display.

A holographic see-through optical device according to an exemplary embodiment may improve brightness uniformity even with a small number of optical parts.

A stereoscopic imaging system may be embodied by applying holographic see-through optical devices to both eyes of a user.

A multimedia head mounted system may be embodied by mounting a holographic see-through optical device on the head of a user.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

The invention claimed is:

1. A holographic see-through optical device comprising:
a micro display;
a relay optical system, which relays an image generated by the micro display;
at least one waveguide comprising at least a first portion having a first top surface and a common bottom surface and a second portion having a second surface and the common bottom surface, the first portion and the second portion having different thicknesses, the first top surface, the second top surface, and the common bottom surface being flat surfaces;
at least one first holographic optical element, which is arranged at the first portion; and
at least one second holographic optical element, which is arranged at the second portion, wherein at least two of the common bottom surface, the first top surface, and the second top surface are parallel to each other, wherein the image generated by the micro display is incident on the common bottom surface of the first portion, and wherein the first top surface and the second top surface of the second portion, respectively, are configured to reflect the image in the at least one waveguide.

2. The holographic see-through optical device of claim 1, wherein the first portion of the waveguide, to which the image generated by the micro display is incident, has a greater thickness than the second portion of the waveguide.

3. The holographic see-through optical device of claim 1, wherein at least one of the thickness and reflectivity of the first portion of the waveguide, to which the image generated by the micro display is incident, is set to diffract light beams on the first holographic optical element.

4. The holographic see-through optical device of claim 1, wherein the first portion and the second portion of the waveguide have gradient refractive indexes.

5. The holographic see-through optical device of claim 1, wherein the relay optical system forms an image of the micro display at an infinite distance.

6. The holographic see-through optical device of claim 1, wherein the waveguide further comprises
an interface surface at which the first portion and the second portion of the waveguide meet each other.

7. The holographic see-through optical device of claim 6, wherein an optical axis of the relay optical system is tilted with respect to a line normal to the common bottom surface of the waveguide.

8. The holographic see-through optical device of claim 6, wherein the at least one first holographic optical element and the at least one second holographic optical element is arranged on the common bottom surface of the first portion and the second portion, respectively.

9. The holographic see-through optical device of claim 1, wherein the at least one of first and second holographic optical elements have different wavelength selectivity or different angle selectivity.

10. The holographic see-through optical device of claim 1, wherein a light beam that propagates in the waveguide is incident on the second holographic optical element, is partially diffracted and partially reflected to a surface of the second portion of the waveguide, and is reflected by the surface of the second portion of the waveguide to the second holographic optical element, which is repeated at least twice.

11. The holographic see-through optical device of claim 1, wherein at least two waveguides are stacked.

12. A stereoscopic imaging system in which holographic see-through optical device of claim 1 is arranged with respect to eyes of a viewer, respectively.

13. The holographic see-through optical device of claim 1, wherein the first portion and the second portion have different refractive indexes.

14. A holographic see-through optical device comprising:
a micro display;
a relay optical system, which relays an image generated by the micro display;
a waveguide comprising a first portion having a first thickness formed between two flat surfaces and a second portion having a second thickness formed between two flat surfaces;
a first holographic optical element arranged at the first portion; and
a second holographic optical element arranged at the second portion,
wherein the relay optical system forms an exit pupil at a location apart from the first portion of the waveguide,
the first holographic optical element combines light beams incident from the relay optical system at the first portion of the waveguide and relays the exit pupil to a region where the first portion meets the second portion of the waveguide, and
the second holographic optical element combines light beams from the waveguide and relays the exit pupil at a location apart from the second portion of the waveguide.

15. The holographic see-through optical device of claim 14, wherein an average thickness of the first portion of the waveguide is greater than an average thickness of the second portion.

16. The holographic see-through optical device of claim 14, wherein the first portion and the second portion have different refractive indexes.

17. A multimedia head mounted system enabling a user to watch a surrounding environment combined with displayed content, the multimedia head mounted system comprising:
a micro display configured to generate an image;
a relay optical system configured to relay the image generated by the micro display;
at least one waveguide comprising at least a first portion and a second portion having different thicknesses formed between two flat surfaces, respectively;
at least one first holographic optical element;
at least one second holographic optical element;
an integrated processor configured to execute instructions to display content to a user; and
earpieces configured to be mounted on a head of the user,
wherein an exit pupil is formed at a location apart from the first portion of the waveguide, the first holographic optical element configured to combine light beams at the first portion of the waveguide and relay the exit pupil to a region where the first portion meets the second portion of the waveguide,
the light beams propagate in the second portion of the waveguide via total internal reflection, and
the second holographic optical element is configured to combine the light beams propagated from the waveguide and relay the exit pupil at a location apart from the second portion of the waveguide.

18. The multimedia head mounted system of claim 17, wherein the first portion and the second portion have different refractive indexes.

* * * * *